United States Patent Office

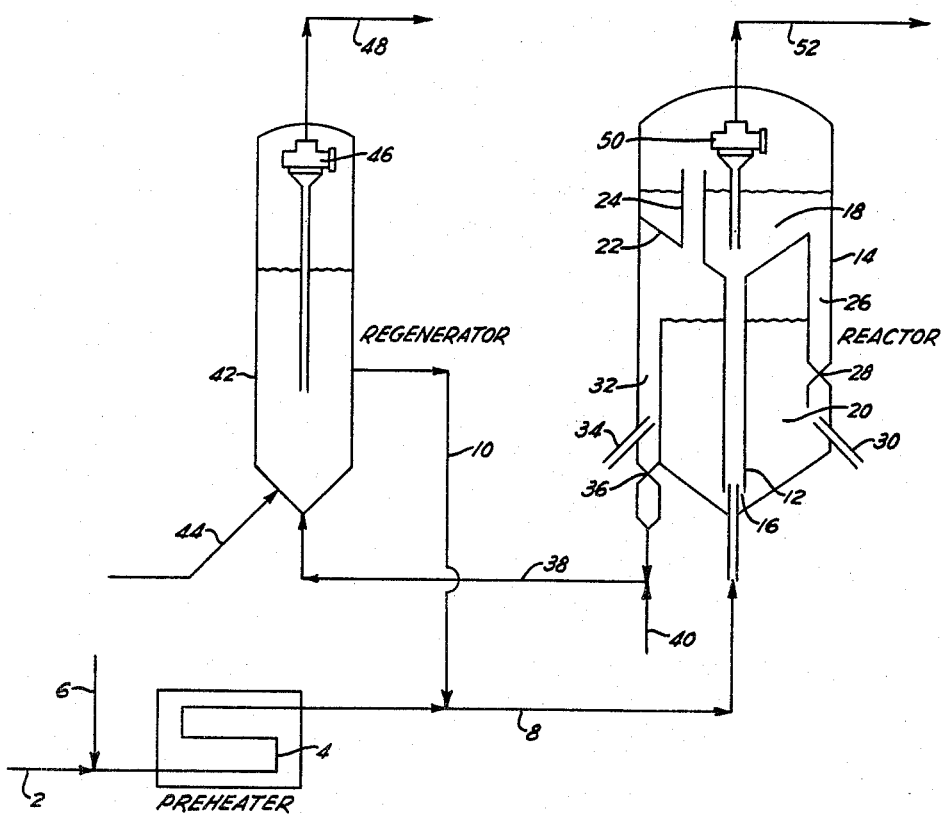

2,959,534
Patented Nov. 8, 1960

2,959,534

PROCESS AND APPARATUS FOR THE DESTRUCTIVE HYDROGENATION OF HYDROCARBON OILS IN TWO STAGES

Merald C. Fogle, Fox Chapel Borough, Pa., assignor to Gulf Research & Development Company, Pittsburgh, Pa., a corporation of Delaware Filed Oct. 16, 1957, Ser. No. 690,541

5 Claims. (Cl. 208—59)

This invention relates to improved procedure for treatment of petroleum hydrocarbons with hydrogen and in particular to treatment of high boiling hydrocarbons containing residual components and sulfur compounds.

It has been proposed in United States Patent No. 2,700,014, Anhorn et al., to treat high boiling hydrocarbons containing residual components by charging them at least partly in liquid phase onto a fluidized hydrogenation catalyst, the rate of introduction being such that the catalyst particles are not substantially wetted by the hydrocarbon liquid and so that the hydrocarbon liquid is adsorbed or absorbed in the pores of the catalyst particles. Hydrocarbons when thus treated under destructive hydrogenation conditions may be completely converted into vapor reaction products and simultaneously desulfurized by conversion of the sulfur compounds into hydrogen sulfide and lower boiling hydrocarbons preferably boiling in the gasoline range.

This invention has for its object to provide improved procedure for preparing catalytic cracking charge stock from residual hydrocarbons. Another object is to provide procedure for obtaining an increased yield of intermediate boiling oils utilizing an improvement in the procedure described in Patent 2,700,014, Anhorn et al. Other objects will appear hereinafter.

These and other objects of my invention are accomplished by introducing into a first catalyst zone hydrogen and a hydrocarbon consisting of or containing liquid residual components, said first catalyst zone containing a fluidized porous hydrogenation catalyst and being maintained under moderate destructive hydrogenation conditions which give rise to formation of intermediate boiling oils, particularly gas oil. In the first catalytic zone the rate of introduction of the charge stock is such as to avoid wetting of the catalyst or exceeding the absorbent capacity of the catalyst as described in the above mentioned Anhorn et al. patent. The hydrogen and charge stock are introduced into the catalyst bed at such a rate that the catalyst particles are maintained fluidized. The vapor reaction products produced in the first catalyst zone are removed from the upper portion of the catalyst bed and are then removed from the system and from further contact with the catalyst. After said contacting the catalyst in the first catalyst zone is introduced into a second reaction zone. The catalyst introduced into the second reaction zone contains absorbed unconverted hydrocarbons which are then further contacted with hydrogen in the second reaction zone whereby the remaining absorbed and unconverted hydrocarbons are substantially converted into lower boiling hydrocarbons. These conversion products are removed from the second zone without further contact with the catalyst in either the first or second catalyst zones. At least part of the catalyst is removed from the second catalyst zone, conveyed to a regenerator where it is subjected to the action of oxygen-containing gas at combustion temperatures to burn off any residual hydrocarbons and coke-like material deposited on the catalyst. The regenerated catalyst is then returned to the first catalyst zone. My invention also includes apparatus for carrying out such procedures.

In the following examples and description I have set forth several of the preferred embodiments of my invention, but it is to be understood that they are given by way of illustration only and not in limitation thereof.

The hydrocarbon charge stock to be treated in accordance with my invention may be any high boiling hydrocarbon which contains residual components, i.e. components which cannot be vaporized without decomposition under the conditions of treatment. Examples of such charge stocks are crude oils, reduced and topped crudes. I prefer to treat residual fractions of crudes and especially those which have an API gravity below about 20. My invention is also particularly useful for the treatment of whole crudes which have a low API gravity such as below 20.

The temperature utilized in the process of my invention may be between about 750° and 875° F. The pressure may be between about 200 and 2000 p.s.i. Thus the invention is applicable only to moderate pressure conditions since the conversion of such heavy oils at high pressures such as 3000 p.s.i. and above constitutes no problem from a technical standpoint. The space velocity may be between about 0.2 and 6. The hydrogen is supplied to the reaction zones at a rate between about 500 and 20,000 standard cubic feet per barrel and at a rate such that the catalyst will be fluidized by the combined passage of the vapors of the hydrocarbon charge stock and hydrogen therethrough.

The conditions in the reaction zones should be adjusted within the above noted limitations to give conversion to oils boiling in the gas oil range with relatively low conversion into naphtha. In general the higher the temperature and the lower the space velocity, the greater will be the degree of conversion and increase in API gravity. In addition to space velocity and temperature, the catalyst to oil ratio has an important effect on degree of conversion. For moderate conversion as contemplated herein, a catalyst to oil ratio between about 0.05 to 0.20 would be utilized. These moderate conversion conditions may be defined as being those within the ranges specified above which result in a gravity increase of less than about 15° API.

Any hydrogenation catalyst may be employed. Thus iron group metals or their oxides or sulfides, group VI metals or their oxides or sulfides may be employed. I prefer to utilize a mixture of the iron group metal oxides or sulfides with the group VI metal oxides or sulfides. Specific examples of satisfactory catalysts are nickel oxide or sulfide, tungsten oxide or sulfide, molybdenum oxide or sulfide and vanadium oxide or sulfide. I prefer to utilize a mixture of nickel oxide and/or sulfide with tungsten oxide and/or sulfide, or a mixture of cobalt oxide and/or sulfide with molybdenum oxide and/or sulfide. These catalysts are preferably deposited upon porous carriers such as alumina, alumina containing a small amount of silica, pumice, a silica-alumina cracking catalyst, etc.

In the accompanying drawing I have illustrated diagrammatically my improved apparatus in which the process described above may be carried out. Referring to the drawing, numeral 2 indicates a conduit through which the residual containing oil is introduced into preheater 4 after mixing with hydrogen introduced through conduit 6. The preheated mixture of hydrogen and oil passes through conduit 8 after mixing with regenerated catalyst flowing through conduit 10. This mixture of hydrogen, catalyst and oil passes upwardly through conduit 12 in reactor 14. Conduit or riser 12 is somewhat larger in diameter than conduit 8 forming an annular space 16 therebetween through which catalyst present in the lower portion 20 of reactor 14 is educted and transported upwardly through conduit 12.

Reactor 14 is divided into upper and lower compartments 18 and 20 respectively by partition 22. Conduit 12 connects at its upper end with an opening in partition 22 as illustrated. Reactor 14 is also provided with a conduit 24 connecting the upper portions of reacting sections 18 and 20. Numeral 26 designates a downcomer provided with valve 28 through which catalyst present during operation in the upper reactor compartment 18 flows downwardly by gravity into the lower reacting compartment 20. Numeral 30 indicates a conduit for introducing hydrogen into the lower portion of reacting compartment 20. For the purpose of clear illustration this has been shown as a single conduit but for effective operation, a plurality of points of introduction or a distributor for the hydrogen should be employed. Numeral 32 designates a downcomer, the upper end of which is at approximately the height of catalyst, present during operation, in lower compartment 20. This downcomer is provided with a conduit 34 for introduction of purging steam and valve 36 to control the rate of removal of catalyst. This removed catalyst flowing through downcomer 32 passes into conduit 38 where it is impelled by transport air or other gas introduced through conduit 40 into the lower portion of regenerator 42. Combustion gas is introduced into regenerator 42 via conduit 44. This gas also maintains the catalyst undergoing regeneration in a fluidized condition. Combustion gases pass upwardly through the regenerator into cyclone separator 46 where catalyst is separated and returned. The combustion gases are then removed through conduit 48. Regenerated catalyst is continuously removed from the regenerator through conduit 10 for addition to fresh charge flowing through conduit 8.

Referring to reactor 14, vapor, reaction products and hydrogen flow through cyclone separator 50 where any catalyst is separated therefrom and returned to the catalyst bed in reacting compartment 18. The vapors and hydrogen then flow through conduit 52 to a recovery system (not shown) where the reaction products are fractionated into desired fractions and the hydrogen is recovered for re-use preferably for recycling in the process.

In the operation of the apparatus illustrated in the drawing, the charge stock and hydrogen are preheated to about reaction temperature in preheater 4, and are then mixed with catalyst particles flowing through conduit 10. Since the amount of catalyst necessary to maintain desired activity in reactor 14 is not great, no difficulty will be encountered in obtaining a fluid mixture which readily flows through conduit 8. This mixture is ejected into conduit 12 at a sufficiently high velocity to induct catalyst particles present in reacting compartment 20. This mixture then flows upwardly into upper reacting compartment 18 where the catalyst bed is fluidized and moderate hydrocracking to gas oil takes place, i.e. the charge stock is incompletely converted in compartment 18, the lower boiling components of the charge stock being vaporized and a moderate conversion into gas oil taking place. Vapors of these reaction products together with hydrogen flow through cyclone separator 50 and conduit 52 to the separating or recovery system.

Catalyst containing a relatively large amount of unconverted, absorbed residual components flows downwardly through downcomer 26 into reacting compartment 20 in the lower portion of reactor 14. This compartment may be at about the same temperature as reacting compartment 18 or may be at a higher temperature which may be obtained by preheating the hydrogen introduced through conduit 30. The objective in compartment 20 is to obtain conversion of the residual components absorbed on the catalyst. The catalyst is also maintained in a fluidized condition in compartment 20. The vapor reaction products produced in compartment 20 pass upwardly through conduit 24 without contact with catalyst in reacting compartment 18. These vapors and hydrogen are combined with the reaction products from compartment 18 and then pass through cyclone separator 50.

The objective in reacting compartment 18 is to remove vaporizable components from the charge stock without substantial conversion and to convert the components of the charge stock which can be relatively easily converted into gas oil. These intermediate boiling reaction products then are removed without further conversion as would be the case if a deep bed of catalyst were employed and these reaction products passed therethrough. The objective in reacting compartment 20 is to convert or hydrocrack the more refractory and higher boiling components, including the residual hydrocarbons and asphalts, into gas oil or the like. This is accomplished, as indicated above, by utilizing a higher temperature or by providing a deep bed of catalyst in reacting compartment 20 so that a longer period of time or a lower space velocity may be used. The reaction products produced in lower compartment 20 are permitted to pass through conduit 24 into the recovery system without further contact with catalyst in the upper reacting compartment 18 so that further conversion of these reaction products to lower boiling materials such as gasoline is minimized.

By operating in the foregoing manner, it is possible to utilize a fluidized bed of catalyst without obtaining a high degree of hydrocracking into lower boiling materials such as naphtha. Furthermore moderate conversion or hydrocracking into high yields of intermediate boiling hydrocarbons is accomplished in a fluidized bed without leaving a residual tar-like material on the fluidized catalyst. It is apparent that removal of a fluidized catalyst bearing large amounts of tar-like material to a regenerator by flowing it through conduits outside of the reactor would be a very difficult operation. However, this problem is avoided by the above described operation since the tars are effectively converted into intermediate boiling products instead of into gasoline as heretofore, before the catalyst particles are sent to the regenerator. If desired, the above described apparatus may be modified to incorporate more than two reaction compartments. In such event the catalyst would be removed from the lowest reacting compartment for regeneration and a conduit similar to 24 would be provided for flow of reaction products, without contact with catalyst, between each of the compartments.

EXAMPLE

One hundred parts by weight of a 53 percent Kuwait reduced crude (composition given in Table I) are preheated and combined with 8 parts by weight nickel oxide-tungsten oxide on H–42 alumina catalyst and are charged to the upper bed of the reactor. The entire reactor contains 100 parts by weight of catalyst of which 20 parts are in the upper bed and 80 parts are in the lower bed. The overall weight space velocity for the reactor is 1.0 part of feed per part of catalyst per hour. Hydrogen (99.8 percent pure) is added with the reduced crude at a rate of 400 s.c.f. per barrel. The pressure in the reactor is 1000 p.s.i.g. and the temperature 810° F. Vaporization of about 10 volume percent of the reduced crude occurs in the riser. This vaporized material is desulfurized about 80 percent and consists largely of equal amounts of heavy gas oil and light gas oil. The actual charge stock to the upper zone is therefore slightly heavier. The yields and properties of the charge stock and products from reaction in the upper zone are given in Table I. The residence time in the upper zone is about 20 percent of the total reaction time (about one hour) and about 40 percent of the remaining material is cracked with about 75 percent desulfurization as shown in Table I.

The catalyst from the upper zone continuously overflows into the lower zone which contains 80 parts by weight of catalyst. The residual components still remaining on the catalyst are completely cracked at 850° F. and 1000 p.s.i.g. to give the volatile products shown in Table I plus coke. Hydrogen is continuously added at a rate of 6000 s.c.f. per barrel. The products from each of the two reaction zones are collected separately to better illustrate the degree of reaction in each of the zones. The total yields of liquid products per 100 volumes of charge are 17.9 volume percent gasoline, 34.7 volume percent light gas oil and 50.0 volume percent heavy gas oil.

Table I (A) PROPERTIES OF ORIGINAL CHARGE AND MATERIAL VAPORIZED IN RISER

|  | 53% Kuwait Reduced Crude | Vaporized Light Gas Oil | Vaporized Heavy Gas Oil |
|---|---|---|---|
| °API | 16.0 | 40.0 | 24.0 |
| S-percent | 3.8 | [1] 0.20 | [2] 0.40 |
| Carbon residue (Conradson) | 9.0 | <0.01 | 0.02 |
| Specific Gravity | 0.959 | 0.825 | 0.910 |
| Parts by volume | 104.3 | 5.3 | 5.3 |
| Parts by weight | 100.0 | 4.37 | 4.82 |

[1] From 1.0.
[2] From 2.0.

(B) PROPERTIES OF CHARGE AND PRODUCTS FROM UPPER ZONE

|  | Charge | Gas | Gasoline | Light Gas Oil | Heavy Gas Oil | Residual |
|---|---|---|---|---|---|---|
| °API | 14.5 |  | 55.0 | 33.5 | 22.4 | 8.6 |
| S-percent | 4.1 |  | 0.1 | 0.5 | 0.9 |  |
| Carbon residue (Conradson) | 10.0 |  |  | <0.01 | 0.02 | 16.5 |
| Specific gravity | 0.969 |  | 0.759 | 0.858 | 0.919 | 1.01 |
| Parts by volume | 93.7 |  | 4.0 | 8.0 | 27.2 | 54.5 |
| Parts by weight | 90.8 | 0.8 | 3.0 | 7.0 | 25.0 | 55.0 |

(C) PROPERTIES OF CHARGE AND PRODUCTS FROM LOWER ZONE

|  | Charge | Gas | Gasoline | Light Gas Oil | Heavy Gas Oil | Residual |
|---|---|---|---|---|---|---|
| °API | 8.6 |  | 54.0 | 31.0 | 20.0 |  |
| S-Percent |  |  | 0.07 | 0.16 | 0.45 |  |
| Carbon residue (Conradson) | 16.5 |  |  | <0.01 | 0.60 |  |
| Specific gravity | 1.01 |  | 0.763 | 0.871 | 0.934 |  |
| Parts by volume | 54.5 |  | 14.7 | 22.9 | 19.7 |  |
| Parts by weight | 55.0 | 3.5 | 11.2 | 19.9 | 18.4 | 2.0 |

(D) PROPERTIES OF TOTAL PRODUCTS FROM THE TWO ZONES

|  | Gasoline | Light Gas Oil | Heavy Gas Oil | Gas | Coke |
|---|---|---|---|---|---|
| °API | 54.1 | 32.5 | 21.7 |  |  |
| S-Percent | 0.08 | 0.2 | 0.7 |  |  |
| Carbon Residue (Conradson) |  | <0.01 | 0.03 |  |  |
| Specific gravity | 0.760 | 0.865 | 0.924 |  |  |
| Parts by volume | 18.7 | 36.2 | 52.2 |  |  |
| Parts by weight | 14.2 | 31.2 | 48.2 | 4.3 | 2.0 |

The relative amounts of catalyst in the different reaction zones will depend upon the nature of the charge stock. The more light gas oil and heavy gas oil or volatilizable material in the charge stock, the larger will be the amount of catalyst in the first or upper zone. The oil portion of the charge stock such as oils boiling up to and including heavy gas oil can be relatively easily desulfurized and moderately converted in the first zone. However, the asphaltic materials in the oil are slowly converted and this requires more thorough contact with the catalyst. Therefore with charge stocks containing very large amounts of asphaltic material, the last or lower zone should be relatively large in order to permit sufficient contact for conversion of the slowly reacting asphaltic materials. In general the ratio of the catalyst in the lower or last compartment to the catalyst in the upper compartment may vary from 1:1 to 10:1.

I claim:

1. In a process for the catalytic destructive hydrogenation of a hydrocarbon mixture which contains residual components in order to form lower boiling hydrocarbons which boil predominantly in the gas oil range wherein a hydrocarbon mixture containing a substantial amount of residual components in liquid phase and hydrogen is contacted with particles of a porous hydrogenation catalyst which particles are suspended in the hydrogen and hydrocarbon vapor and are maintained at a temperature between about 750° and 875° F. and at a pressure between about 250 and 2000 p.s.i.g. and wherein the rate of introduction of the hydrocarbon mixture is controlled so that a substantial amount of the liquid portion of the residual components is initially absorbed in the pores of the catalyst particles but so that the total amount of liquid in contact with the catalyst particles at any time is less than the amount which can be absorbed in the pores of the catalyst particles and wherein the catalyst particles are maintained in a turbulent and suspended condition in the hydrogen and hydrocarbon vapors, that improvement which comprises introducing the charge stock while partly in liquid phase into contact with a first bed of catalyst particles deposited upon a porous carrier, maintaining the catalyst particles suspended in the hydrocarbon vapors and hydrogen, removing vapor reaction products from the upper portion of the first bed of catalyst particles without further contact with catalyst particles, continuously removing catalyst particles from the first bed of catalyst, said removed catalyst particles containing relatively large amounts of absorbed unconverted residual hydrocarbon, contacting the removed catalyst particles containing absorbed unconverted residual hydrocarbon with hydrogen in the absence of additional charge stock in a second reaction zone in which the catalyst particles are maintained fluidized by passage of hydrogen gas upwardly therethrough, removing conversion products in vapor form from the second catalyst bed without further contact with catalyst particles, continuously removing the catalyst particles from the second catalyst bed, regenerating these removed catalyst particles by combustion, returning regenerated catalyst particles to the first catalyst bed and maintaining a ratio of catalyst in the second reaction zone to catalyst in the first bed of catalyst of between about 1:1 and 10:1.

2. In a process for the catalytic destructive hydrogenation of a hydrocarbon mixture which contains difficultly vaporizable hydrocarbon components in order to form lower boiling hydrocarbons which boil predominantly in the gas oil range wherein a hydrocarbon mixture containing a substantial amount of difficultly vaporizable components in liquid phase and hydrogen is contacted with particles of a porous hydrogenation catalyst which are suspended in the hydrogen and hydrocarbon vapor and which are maintained at a temperature between about 750° and 875° F. and at a pressure between about 250 and 2000 p.s.i.g. and wherein the rate of introduction of the hydrocarbon mixture is controlled so that a substantial amount of the liquid portion of the difficultly vaporizable hydrocarbon components is initially absorbed in the pores of the catalyst particles but so that the total amount of liquid in contact with the catalyst particles at any time is less than the amount which can be absorbed in the pores of the catalyst particles and wherein the catalyst particles are maintained in a turbulent and suspended condition in the hydrogen and hydrocarbon vapors, that improvement which comprises forming finely divided hydrogenation catalyst into two reaction beds one of which is superimposed over the other and both of which are under substantially identical conditions of temperature and pressure, removing catalyst particles from the lower catalyst bed and introducing the removed catalyst particles together with hydrogen and fresh charge stock into the upper catalyst bed, said charge stock being introduced while partly in liquid phase, maintaining the catalyst particles suspended in the hydrocarbon vapors and hydrogen in the upper catalyst bed, removing vapor reaction products from the upper portion of the upper catalyst bed without further contact with catalyst particles in either of the catalyst beds, causing excess catalyst particles in the upper catalyst bed to flow by gravity into the lower catalyst bed, said catalyst particles flowing by gravity into the lower catalyst bed containing relatively large amounts of unconverted residual hydrocarbon absorbed thereon, passing hydrogen in the absence of additional charge stock through the lower catalyst bed at a rate sufficient to maintain the catalyst particles therein in a fluidized condition, removing conversion products in vapor form from the lower catalyst bed without further contact with catalyst particles, continuously removing catalyst particles from the lower catalyst bed, regenerating these removed catalyst particles by combustion, returning regenerated catalyst particles to the upper catalyst bed and maintaining a ratio of catalyst in the lower catalyst bed to catalyst in the upper catalyst bed of between about 1:1 and 10:1.

3. In a process for the catalytic destructive hydrogenation of a vacuum reduced crude which contains residual components in order to form lower boiling hydrocarbons which boil predominantly in the gas oil range wherein the vacuum reduced crude while to a substantial extent in liquid phase and hydrogen is contacted with particles of a porous hydrogenation catalyst which are suspended in the hydrogen and hydrocarbon vapor and which are maintained at a temperature between about 750° and 875° F. and at a pressure between about 250 and 2000 p.s.i.g. and wherein the rate of introduction of the vacuum reduced crude is controlled so that a substantial amount of the liquid portion thereof is initially absorbed in the pores of the catalyst particles but so that the total amount of liquid in contact with the catalyst particles at any time is less than the amount which can be absorbed in the pores of the catalyst particles and wherein the catalyst particles are maintained in a turbulent and suspended condition in the hydrogen and hydrocarbon vapors, that improvement which comprises introducing said charge stock while partly in liquid phase into contact with a first bed of catalyst particles deposited upon a porous carrier, maintaining the catalyst particles suspended in the hydrocarbon vapors and hydrogen, removing vapor reaction products from the upper portion of the first bed of catalyst particles without further contact with catalyst particles, continuously removing catalyst particles from the first bed of catalyst, said removed catalyst particles containing relatively large amounts of absorbed unconverted residual hydrocarbon, contacting the removed catalyst particles containing absorbed unconverted residual hydrocarbons with hydrogen in the absence of additional charge stock in a second reaction zone in which the catalyst particles are maintained fluidized by passage of hydrogen gas upwardly therethrough, removing conversion products in vapor form from the second catalyst bed without further contact with catalyst particles, continuously removing the catalyst particles from the second catalyst bed, regenerating these removed catalyst particles by combustion, returning regenerated catalyst particles to the first catalyst bed and maintaining a ratio of catalyst in the second reaction zone to catalyst in the first bed of catalyst of between about 1:1 and 10:1.

4. Catalytic apparatus comprising in combination a plurality of superimposed reaction chambers adapted during operation to hold a fluidized bed of catalyst, means for introducing particulate catalyst and hydrocarbon charge stock into the upper reaction chamber, a passageway for catalyst to overflow from each of the reaction chambers, except the lowest, to the next lowest reaction chamber, means for removing catalyst particles from the lowest reaction chamber, a regenerator, means for conveying the removed catalyst to the regenerator, means for conveying regenerated catalyst from the regenerator to the uppermost reaction chamber, a passageway between each adjacent pair of chambers for vapors to flow upwardly to the uppermost reaction chamber without substantial contact with catalyst excepting that catalyst present in the reaction chamber in which the vapors were formed, a cyclone separator in the uppermost reaction chamber for separating catalyst particles from gases and vapor reaction products derived from all of the reaction chambers, means for returning said separated particles, to said upper reaction chamber, means for removing reaction products derived from all of the reaction chambers from the exhaust side of the cyclone separator, and means for introducing hydrogen into each of the reaction chambers.

5. Catalytic apparatus comprising in combination a cylindrical casing provided with end closures, a partition intermediate the end closures dividing the casing into two reaction chambers one of which is superimposed over the other and both of which are adapted during operation to hold a fluidized bed of particulate catalyst, means for introducing hydrogen and hydrocarbon charge stock into the upper reaction chamber, means for conveying particulate catalyst from the lower to the upper reaction chamber, a passageway for catalyst to flow by gravity from the upper reaction chamber to the lower reaction chamber, means for removing catalyst particles from the lower reaction chamber, a regenerator, means for conveying the removed catalyst to the regenerator, means for conveying regenerated catalyst from the regenerator to the upper reaction chamber, a cyclone separator positioned in the upper reaction chamber, means for removing gases and reaction products from the upper reaction chamber via the cyclone separator, means for conveying vapor reaction products from the lower reaction chamber to the cyclone separator without substantial contact with catalyst in the upper reaction chamber, and means for introducing hydrogen into the lower reaction chamber.

References Cited in the file of this patent

UNITED STATES PATENTS

| | | |
|---|---|---|
| 2,530,645 | Bockman | Nov. 21, 1950 |
| 2,690,990 | Adams et al. | Oct. 5, 1954 |
| 2,729,810 | Leffer | Dec. 10, 1955 |
| 2,799,626 | Johnson et al. | July 16, 1957 |
| 2,847,364 | Hirsch | Aug. 12, 1958 |
| 2,885,344 | Garbo | May 5, 1959 |

UNITED STATES PATENT OFFICE
CERTIFICATION OF CORRECTION

Patent No. 2,959,534                      November 8, 1960

Merald C. Fogle

It is hereby certified that error appears in the above numbered patent requiring correction and that the said Letters Patent should read as corrected below.

Column 4, line 65, for "400" read -- 4000 --; column 8, line 64, list of references cited, for the patent number "2,729,810" read -- 2,727,810 --.

Signed and sealed this 9th day of May 1961.

(SEAL)
Attest:
ERNEST W. SWIDER
Attesting Officer

DAVID L. LADD
Commissioner of Patents